United States Patent
Harada

(10) Patent No.: US 7,962,338 B2
(45) Date of Patent: Jun. 14, 2011

(54) SPEECH RECOGNITION APPARATUS, SPEECH RECOGNITION METHOD AND RECORDING MEDIUM HAVING SPEECH RECOGNITION SOFTWARE PROGRAM RECORDED THEREON

(75) Inventor: Shouji Harada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 832 days.

(21) Appl. No.: 11/983,872

(22) Filed: Nov. 13, 2007

(65) Prior Publication Data

US 2008/0120107 A1    May 22, 2008

(30) Foreign Application Priority Data

Nov. 20, 2006   (JP) .................................. 2006-313198

(51) Int. Cl.
*G10L 15/04*   (2006.01)
*G10L 15/00*   (2006.01)
(52) U.S. Cl. ........................................ 704/251; 704/239
(58) Field of Classification Search .................. 704/250, 704/251, 239, 236
See application file for complete search history.

(56) References Cited

U.S. PATENT DOCUMENTS

| | | | |
|---|---|---|---|
| 6,473,735 B1 * | 10/2002 | Wu et al. ........................ | 704/240 |
| 6,697,782 B1 * | 2/2004 | Iso-Sipila et al. ............. | 704/275 |
| 6,735,562 B1 * | 5/2004 | Zhang et al. .................. | 704/240 |
| 2003/0125943 A1 * | 7/2003 | Koshiba ........................ | 704/238 |

FOREIGN PATENT DOCUMENTS

| | | |
|---|---|---|
| JP | 10-49190 | 2/1998 |
| JP | 2002-372988 | 12/2002 |

* cited by examiner

*Primary Examiner* — Angela A Armstrong
(74) *Attorney, Agent, or Firm* — Greer, Bruns & Crain, Ltd.

(57) ABSTRACT

When the degree of similarity of the recognition candidates is greater than the second threshold value, the speech verification unit outputs the recognition candidates as a recognition result, and when the degree of similarity of the recognition candidates is smaller than the second threshold value, it outputs the recognition candidates as a recognition result if the degree of similarity of the recognition candidates is greater than the first threshold value and, at the same time, the degree of similarity of the recognition candidates is greater than the degree of similarity of the rejection candidates. It should be noted that the first threshold value is a measure used for rejecting input speech. The second threshold value is larger than the first threshold value and is used as a measure for outputting recognition candidates as a recognition result.

7 Claims, 15 Drawing Sheets

|  | Word ID | Word Spelling | Word Reading | Phonemic Sequence |
|---|---|---|---|---|
| R1 | 001 | Kyoto | kyouto | /k/y/o/t/o/ |
| R2 | 002 | Shiga | shiga | /s/h/i/g/a/ |
| R3 | 003 | Osaka | oosaka | /o/s/a/k/a/ |
| R4 | 004 | Nara | nara | /n/a/r/a/ |
| R5 | 005 | Wakayama | wakayama | /w/a/k/a/y/a/m/a/ |
| R6 | 006 | Hyogo | hyougo | /h/y/o/g/o/ |
| R7 | 007 | Mie | mie | /m/i/e/ |

| | Word ID | Word Spelling | Word Reading | Phonemic Sequence |
|---|---|---|---|---|
| R1 | 101 | Tokyo | toukyou | /t/o/k/y/o/ |
| R2 | 102 | Saga | saga | /s/a/g/a/ |
| R3 | 103 | Oita | ooita | /o/i/t/a/ |
| R4 | 104 | Okayama | okayama | /o/k/a/y/a/m/a/ |
| R5 | 105 | Toyama | toyama | /t/o/y/a/m/a/ |
| | ... | ... | ... | ... |

| 8a |
|---|
| First Threshold Value |
| 0.5 |

FIG. 5

| 9a |
|---|
| Second Threshold Value |
| 0.8 |

|  | Word ID | Second Threshold Value |
|---|---|---|
| R1 | 001 | 0.7 |
| R2 | 002 | 0.8 |
| R3 | 003 | 0.7 |
| R4 | 004 | 0.8 |
| R5 | 005 | 0.7 |
| R6 | 006 | 0.7 |
| R7 | 007 | 0.9 |

31a

F I G. 13

|   | Word ID | Word Spelling | Word Reading | Phonemic Sequence | Second Threshold Value |
|---|---------|---------------|--------------|-------------------|------------------------|
| R1 | 001 | Kyoto | kyouto | /k/y/o/t/o/ | 0.7 |
| R2 | 002 | Shiga | shiga | /s/h/i/g/a/ | 0.8 |
| R3 | 003 | Osaka | oosaka | /o/s/a/k/a/ | 0.7 |
| R4 | 004 | Nara | nara | /n/a/r/a/ | 0.8 |
| R5 | 005 | Wakayama | wakayama | /w/a/k/a/y/a/m/a | 0.7 |
| R6 | 006 | Hyogo | hyougo | /h/y/o/g/o/ | 0.7 |
| R7 | 007 | Mie | mie | /m/i/e/ | 0.9 |

FIG. 15

SPEECH RECOGNITION APPARATUS, SPEECH RECOGNITION METHOD AND RECORDING MEDIUM HAVING SPEECH RECOGNITION SOFTWARE PROGRAM RECORDED THEREON

BACKGROUND OF THE INVENTION

1. Field of the Invention

The present invention relates to a speech recognition apparatus, a speech recognition method, and a recording medium having a speech recognition software program recorded thereon, and, more particularly, to a speech recognition apparatus, a speech recognition method, and a recording medium having recorded thereon a speech recognition software program, which, as a result of being provided with a rejectable word dictionary that stores rejectable vocabulary words in addition to a recognition word dictionary that stores recognition vocabulary words, is capable of rejecting background noise, background speech, or utterances of out-of-recognition vocabulary words and outputting recognition results only when recognition vocabulary words are uttered.

2. Description of Related Art

Speech recognition apparatuses using a speech recognition engine as a means of accepting input from a user in order to recognize user utterances (speech) and accept them as input to the system have been known in the past. For example, such speech recognition apparatuses have already been put to practical use in information providing systems, including speech portals, car navigation systems, etc.

Incidentally, such speech recognition apparatuses suffered from the problem that, for instance, depending on the environment of use of the information providing system provided with such speech recognition apparatuses, background noise, background speech, and the like may be misrecognized as recognition vocabulary words. Moreover, there is the problem that words might be misrecognized as recognition vocabulary words when the user utters out-of-recognition vocabulary words.

To eliminate such problems, a speech recognition apparatus has been proposed which, in addition to a recognition word dictionary that stores recognition vocabulary words, is provided with a rejectable word dictionary that stores rejectable vocabulary words. Specifically, this speech recognition apparatus, along with computing the degree of similarity between the input speech and the recognition vocabulary words, computes the degree of similarity between the input speech and the rejectable vocabulary words. As a result of computing the degree of similarity, recognition vocabulary words are outputted as a recognition result when the degree of similarity of the recognition vocabulary words is higher than the degree of similarity of the rejectable vocabulary words. On the other hand, it rejects input speech when the degree of similarity of the recognition vocabulary words is smaller than the degree of similarity of the rejectable vocabulary words. Thus, storing background noise, background speech, or out-of-recognition vocabulary words as rejectable vocabulary words in the rejectable word dictionary makes it possible to prevent background noise, background speech, or out-of-recognition vocabulary words from being misrecognized as recognition vocabulary words (see, for instance, JP 2002-372988A or JP H10-49190A).

However, if the recognition vocabulary words and rejectable vocabulary words in such a speech recognition apparatus are, for instance, identical or similar, user utterances get mistakenly rejected despite the fact that the user utters recognition vocabulary words when the degree of similarity of the rejectable vocabulary words is higher than the degree of similarity of the recognition vocabulary words.

Thus, in the speech recognition apparatus disclosed in JP 2002-372988A, a rejectable word removal unit removes rejectable vocabulary words that are the same or similar to the recognition vocabulary words stored in a recognition word dictionary from a rejectable word database storing a comprehensive set of rejectable words. The rejectable word removal unit generates a rejectable word dictionary by storing the residual rejectable vocabulary words remaining in the rejectable word database in a rejectable word dictionary. This makes it possible to prevent user utterances from getting mistakenly rejected when the user utters recognition vocabulary words.

However, the following problems arise in connection with the configuration disclosed in JP 2002-372988A mentioned above.

Namely, in the speech recognition apparatus of JP 2002-372988A, the rejectable word dictionary has to be updated by removing rejectable vocabulary words that are the same or similar to the recognition vocabulary words from the rejectable word database and storing the residual rejectable vocabulary words remaining in the rejectable word database in the rejectable word dictionary whenever changes are made to the recognition vocabulary words stored in the recognition word dictionary. For this reason, manual and time-consuming operations are required to update the rejectable word dictionary when changes are made to the recognition vocabulary words stored in the recognition word dictionary.

SUMMARY OF THE INVENTION

The present invention was made with account taken of the problems described above and its object is to provide a speech recognition apparatus, a speech recognition method, and a recording medium having recorded thereon a speech recognition software program, which is capable of preventing user utterances from being mistakenly rejected when the user utters recognition vocabulary words, and, at the same time, being able to reduce manual and time-consuming operations required to update the rejectable word dictionary even when changes are made to the recognition vocabulary words stored in the recognition word dictionary.

In order to attain the object mentioned above, the speech recognition apparatus of the present invention comprises: a speech input unit that converts input speech into uttered speech data; a speech analysis unit that converts the uttered speech data into characteristic quantities; a recognition word dictionary that stores a plurality of recognition vocabulary words; a rejectable word dictionary that stores a plurality of rejectable vocabulary words; a speech verification unit that computes the degree of similarity between the input speech and the plurality of recognition vocabulary words stored in the recognition word dictionary using the characteristic quantities obtained through conversion by the speech analysis unit, computes the degree of similarity between the input speech and the plurality of rejectable vocabulary words stored in the rejectable word dictionary using the characteristic quantities obtained through conversion by the speech analysis unit, and, as a result of computing these degrees of similarity, extracts recognition vocabulary words with the highest degree of similarity from among the recognition vocabulary words as recognition candidates, and extracts rejectable vocabulary words with the highest degree of similarity from among the rejectable vocabulary words as rejection candidates; a first threshold value storage unit that stores a first threshold value used as a measure for rejecting the input speech; and a second threshold value storage unit that stores a second threshold value, which is greater than the first threshold value and is used as a measure for outputting the recognition candidates as a recognition result. The speech verification unit outputs the recognition candidates as a recognition result if the degree of similarity of the recognition candidates is greater than the second threshold value and, if the degree of similarity of the recognition candidates is smaller than the second threshold value, outputs the recognition candidates as a recognition result when the degree of similarity of the recognition candidates is greater than the first threshold value and, at the same time, the degree of similarity of the recognition candidates is higher than the degree of similarity of the rejection candidates.

Incidentally, conventional speech recognition apparatuses suffered from the problem that when the rejectable vocabulary words stored in the rejectable word dictionary are identical or similar to the recognition vocabulary words stored in the recognition word dictionary, user utterances get mistakenly rejected despite the fact that the user utters recognition candidates when the degree of similarity of user utterances and the rejection candidates is higher than the degree of similarity of user utterances and the recognition candidates. For this reason, in conventional speech recognition apparatuses, it was necessary to update the rejectable word dictionary by removing rejectable vocabulary words that are the same or similar to the recognition vocabulary words from the rejectable word database and storing the residual rejectable vocabulary words remaining in the rejectable word database in the rejectable word dictionary whenever changes are made to the recognition vocabulary words stored in the recognition word dictionary. For this reason, conventional speech recognition apparatuses suffered from the problem that manual and time-consuming operations are required to update the rejectable word dictionary when changes are made to the recognition vocabulary words stored in the recognition word dictionary.

On the other hand, in the speech recognition apparatus of the present invention, when the degree of similarity of the recognition candidates is greater than the second threshold value, the speech verification unit outputs the recognition candidates as a recognition result regardless of the degree of similarity of the rejection candidates. It should be noted that the second threshold value is a measure used for outputting the recognition candidates as a recognition result. Therefore, as long as the degree of similarity of the recognition candidates is greater than the second threshold value, the recognition candidates can be outputted as a recognition result even in the case where the degree of similarity of the rejection candidates becomes higher than the degree of similarity of the recognition candidates as a result of the recognition candidates and rejection candidates being identical or similar. For this reason, in the speech recognition apparatus of the present invention, user utterances do not get mistakenly rejected, for example, when the user utters recognition candidates, even if rejectable vocabulary words that are the same or similar to the recognition vocabulary words are stored in the rejectable word dictionary. Therefore, there is no need to update the rejectable word dictionary in the manner used in the conventional speech recognition apparatuses described above, that is, by removing rejectable vocabulary words that are the same or similar to the recognition vocabulary words from the rejectable word database and storing the residual rejectable vocabulary words remaining in the rejectable word database in the rejectable word dictionary whenever changes are made to the recognition vocabulary words stored in the recognition word dictionary. As a result, the manual and time-consuming operations required to update the rejectable word dictionary can be reduced even when changes are made to the recognition vocabulary words stored in the recognition word dictionary while at the same time preventing user utterances from being mistakenly rejected despite the fact that the user utters recognition vocabulary words.

In a preferred embodiment of the speech recognition apparatus of the present invention described above, if the degree of similarity of the recognition candidates is greater than the first threshold value, the speech verification unit rejects the input speech, when the degree of similarity of the recognition candidates is smaller than the second threshold value and, at the same time, the degree of similarity of the recognition candidates is smaller than the degree of similarity of the rejection candidates, and rejects the input speech if the degree of similarity of the recognition candidates is smaller than the first threshold value.

In accordance with the configuration described above, if the degree of similarity of the recognition candidates is greater than the first threshold value, the speech verification unit rejects the input speech when the degree of similarity of the recognition candidates is smaller than the second threshold value and, at the same time, the degree of similarity of the recognition candidates is smaller than the degree of similarity of the rejection candidates. On the other hand, the speech verification unit rejects input speech, if the degree of similarity of the recognition candidates is smaller than the first threshold value. Thus, storing background noise, background speech, or out-of-recognition vocabulary words as rejectable vocabulary words in the rejectable word dictionary, makes it possible to reliably prevent background noise, background speech, or out-of-recognition vocabulary words from being misrecognized as recognition vocabulary words.

In a preferred embodiment of the speech recognition apparatus of the present invention described above, the apparatus further comprises a compensation data storage unit that stores compensation data used for varying at least one degree of similarity among the degree of similarity of the recognition candidates and the degree of similarity of the rejection candidates. The speech verification unit varies at least one degree of similarity among the degree of similarity of the recognition candidates and the degree of similarity of the rejection candidates based on the compensation data.

In accordance with the configuration described above, the speech verification unit varies at least one degree of similarity among the degree of similarity of the recognition candidates and the degree of similarity of the rejection candidates based on the compensation data. If the speech verification unit decreases the degree of similarity of the recognition candidates or increases the degree of similarity of the rejection candidates, the recognition rate of the speech recognition apparatus decreases. On the other hand, if the speech verification unit increases the degree of similarity of the recognition candidates or decreases the degree of similarity of the rejection candidates, the recognition rate of the speech recognition apparatus goes up. This makes it possible to implement a speech recognition apparatus suited to the actual situation (conditions of use, etc.) of the system provided with the speech recognition apparatus.

In a preferred embodiment of the speech recognition apparatus of the present invention described above, the second threshold value storage unit stores second threshold values respectively corresponding to each of the recognition vocabulary words.

In accordance with the configuration described above, a second threshold value respectively corresponding to each of the recognition vocabulary words is stored in the second threshold value storage unit. This allows the speech verification unit to vary the measure used to output recognition candidates as a recognition result in response to the recognition vocabulary words.

In a preferred embodiment of the speech recognition apparatus of the present invention described above, it further comprises a plurality of rejectable word dictionaries respectively containing different numbers of rejectable vocabulary words and a selection unit that selects a rejectable word dictionary subject to degree-of-similarity computation by the speech verification unit from among the plurality of rejectable word dictionaries based on the number of the recognition vocabulary words stored in the recognition word dictionary.

In accordance with the configuration described above, the selection unit, based on the number of the recognition vocabulary words stored in the recognition word dictionary, selects a rejectable word dictionary subject to degree-of-similarity computation by the speech verification unit from among the plurality of rejectable word dictionaries. For example, as the number of the recognition vocabulary words stored in the recognition word dictionary increases, the selection unit selects a rejectable word dictionary with a smaller number of rejectable vocabulary words. This makes it possible to maintain a constant speed of recognition in the speech recognition apparatus and avoid bringing about a decrease in the speed of recognition of the speech recognition apparatus.

In order to attain the object mentioned above, in the speech recognition method of the present invention, a computer provided with a recognition word dictionary that stores a plurality of recognition vocabulary words and a rejectable word dictionary that stores a plurality of rejectable vocabulary words carries out: a speech input step of converting input speech into uttered speech data; a speech analysis step of converting the uttered speech data into characteristic quantities; and a speech verification step of computing the degree of similarity between the input speech and the plurality of recognition vocabulary words stored in the recognition word dictionary using the characteristic quantities obtained through conversion in the speech analysis step, computing the degree of similarity between the input speech and the plurality of rejectable vocabulary words stored in the rejectable word dictionary using the characteristic quantities obtained through conversion in the speech analysis step, and, as a result of computing these degrees of similarity, extracting recognition vocabulary words with the highest degree of similarity from among the recognition vocabulary words as recognition candidates and extracting rejectable vocabulary words with the highest degree of similarity from among the rejectable vocabulary words as rejection candidates. The computer is able to access a first threshold value storage unit that stores a first threshold value used as a measure for rejecting the input speech and a second threshold value storage unit that stores a second threshold value, which is greater than the first threshold value and is used as a measure for outputting the recognition candidates as a recognition result, and the speech verification step further comprises the steps of outputting recognition candidates as a recognition result, if the degree of similarity of the recognition candidates is greater than the second threshold value and, if the degree of similarity of the recognition candidates is smaller than the second threshold value, outputting recognition candidates as a recognition result when the degree of similarity of the recognition candidates is greater than the first threshold value and, at the same time, the degree of similarity of the recognition candidates is higher than the degree of similarity of the rejection candidates.

In order to attain the object mentioned above, the recording medium having a speech recognition software program recorded thereon of the present invention is a recording medium having recorded thereon a speech recognition program that causes a computer provided with a recognition word dictionary that stores a plurality of recognition vocabulary words and a rejectable word dictionary that stores a plurality of rejectable vocabulary words to carry out speech recognition processing. The computer is caused to carry out a speech input process of converting input speech into uttered speech data; a speech analysis process of converting the uttered speech data into characteristic quantities; a speech verification process of computing the degree of similarity between the input speech and the plurality of recognition vocabulary words stored in the recognition word dictionary using the characteristic quantities obtained through conversion in the speech analysis process, computing the degree of similarity between the input speech and the plurality of rejectable vocabulary words stored in the rejectable word dictionary using the characteristic quantities obtained through conversion in the speech analysis process, and, as a result of computing these degrees of similarity, extracting recognition vocabulary words with the highest degree of similarity from among the recognition vocabulary words as recognition candidates and extracting rejectable vocabulary words with the highest degree of similarity from among the rejectable vocabulary words as rejection candidates. The computer is able to access a first threshold value storage unit that stores a first threshold value used as a measure for rejecting the input speech and a second threshold value storage unit that stores a second threshold value, which is greater than the first threshold value and is used as a measure for outputting the recognition candidates as a recognition result. The speech verification process further causes the computer to carry out the process of outputting recognition candidates as a recognition result when the degree of similarity of the recognition candidates is greater than the second threshold value and, when the degree of similarity of the recognition candidates is smaller than the second threshold value, outputting recognition candidates as a recognition result if the degree of similarity of the recognition candidates is greater than the first threshold value and, at the same time, the degree of similarity of the recognition candidates is higher than the degree of similarity of the rejection candidates.

It should be noted that the inventive speech recognition method and recording medium having a speech recognition software program recorded thereon have the same effects as the speech recognition apparatus described above.

BRIEF DESCRIPTION OF THE DRAWINGS

FIG. 2 is a diagram illustrating an exemplary data structure of a recognition word dictionary used in the speech recognition apparatus.

FIG. 3 is a diagram illustrating an exemplary data structure of a rejectable word dictionary used in the speech recognition apparatus.

FIG. 4 is a diagram illustrating an exemplary data structure of a first threshold value storage unit used in the speech recognition apparatus.

FIG. 5 is a diagram illustrating an exemplary data structure of a second threshold value storage unit used in the speech recognition apparatus.

FIG. 13 is a diagram illustrating an exemplary data structure of a second threshold value storage unit used in the speech recognition apparatus.

FIG. 15 is a diagram illustrating an exemplary data structure of a recognition word dictionary.

DESCRIPTION OF THE PREFERRED EMBODIMENTS

Below, more specific embodiments of the present invention will be described in detail with reference to drawings.

Embodiment 1

Figure 1:
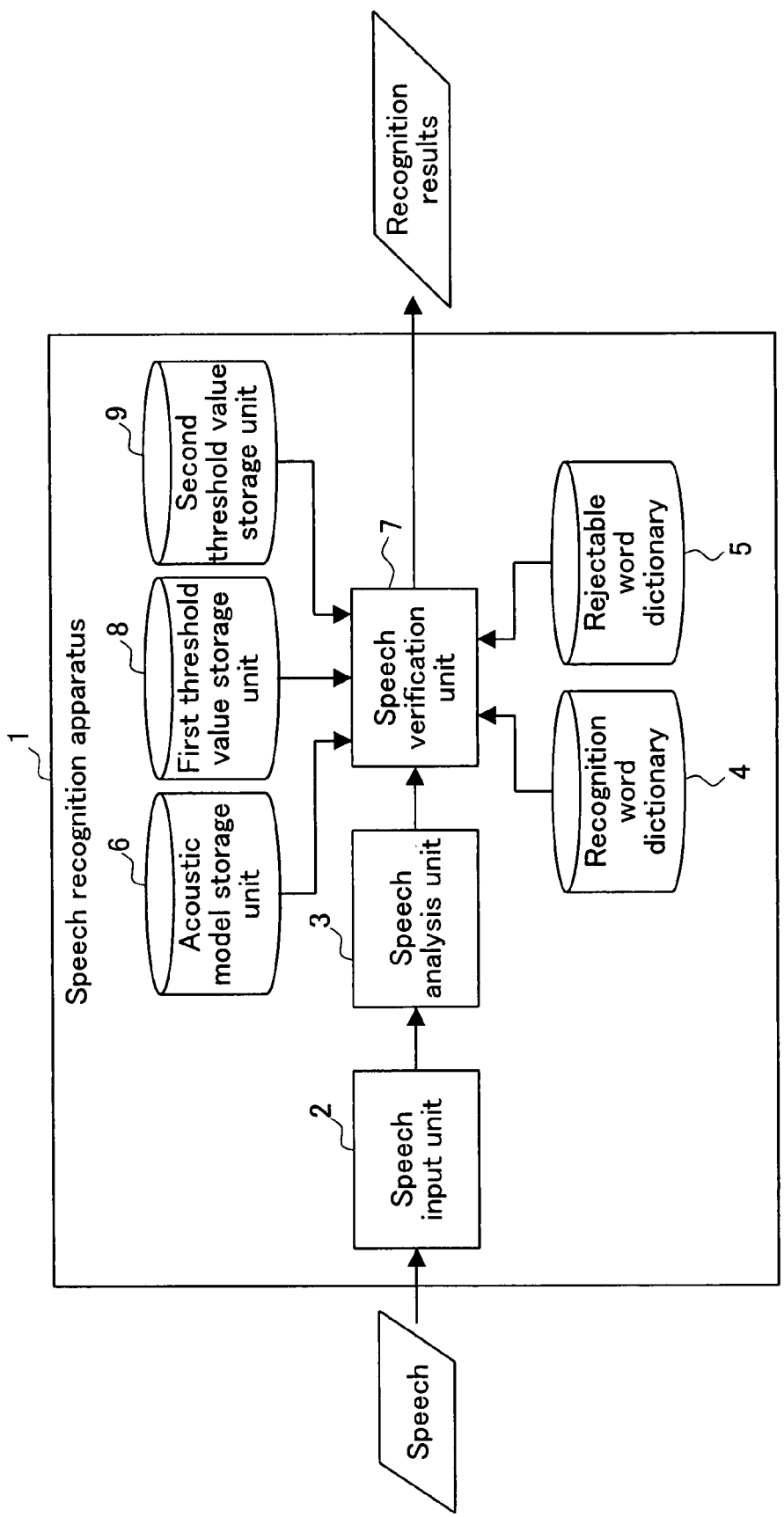
FIG. 1 is a block diagram schematically illustrating the configuration of a speech recognition apparatus according to a first embodiment of the present invention.

FIG. 1 is a block diagram schematically illustrating the configuration of the speech recognition apparatus 1 according to the present embodiment. Namely, the speech recognition apparatus 1 according to the present embodiment is provided with a speech input unit 2, a speech analysis unit 3, a recognition word dictionary 4, a rejectable word dictionary 5, an acoustic model storage unit 6, a speech verification unit 7, a first threshold value storage unit 8, and a second threshold value storage unit 9. The speech recognition apparatus 1 according to the present embodiment is an apparatus having the ability to accept user speech passed on from a higher-level software program, such as, for instance, a speech dialog application, etc., and return recognition results to the higher-level software program, etc.

The speech input unit 2 converts input speech (utterances) into uttered speech data. Specifically, during speech input, the speech input unit 2 uses predetermined voiced interval determination criteria to determine voiced intervals in the input speech. The speech input unit 2 converts the speech in the determined voiced intervals to uttered speech data. The speech input unit 2 outputs the uttered speech data obtained through conversion to the speech analysis unit 3.

The speech analysis unit 3 computes characteristic quantities by analyzing the uttered speech data. Oftentimes, in addition to MFCC, LPC cepstra or powers, as well as first-order and second-order regression coefficients, the characteristic quantities are multidimensional vectors including, but not limited to, vectors obtained by subjecting the values to dimensional compression using principal component analysis or discriminant analysis. The speech input unit 3 outputs the computed characteristic quantities to the speech verification unit 7. It should be noted that the speech verification unit 3 may be provided with a memory for storing the computed characteristic quantities.

The recognition word dictionary 4 stores a plurality of recognition vocabulary words and information regarding the plurality of recognition vocabulary words. As shown, for instance, in FIG. 2, the recognition word dictionary 4 stores the plurality of recognition vocabulary words and information regarding the plurality of recognition vocabulary words in the form of a recognition word dictionary table 4a. In the example illustrated in FIG. 2, the recognition word dictionary table 4a stores word IDs, word spellings, word readings, and phonemic sequences. The word IDs represent information uniquely associated with the recognition vocabulary words. The word spellings represent information describing the way the recognition vocabulary words are written. The word readings represent information related to the reading of the recognition vocabulary words reflected in the word spellings. The phonemic sequences are the recognition vocabulary words subject to degree-of-similarity computation by the speech verification unit 7. It should be noted that while the recognition vocabulary word-related information includes the word IDs, word spellings, and word readings described above, it may additionally include other arbitrary information, such as rules regarding connections (grammar information) between the recognition vocabulary words.

In the example illustrated in FIG. 2, the first row, R1, of the recognition word dictionary table 4a stores a word ID "001", a word spelling "Kyoto", a word reading "kyouto", and a phonemic sequence "/k/y/o/t/o/". The second row, R2, stores a word ID "002", a word spelling "Shiga", a word reading "shiga", and a phonemic sequence "/s/h/i/g/a/". The third row, R3, stores a word ID "003", a word spelling "Osaka", a word reading "oosaka", and a phonemic sequence "/o/s/a/k/a/". The fourth row, R4, stores a word ID "004", a word spelling "Nara", a word reading "nara", and a phonemic sequence "/n/a/r/a/". The fifth row, R5, stores a word ID "005", a word spelling "Wakayama", a word reading "wakayama", and a phonemic sequence "/w/a/k/a/y/a/m/a/". The sixth row, R6, stores a word ID "006", a word spelling "Hyogo", a word reading "hyougo", and a phonemic sequence "/h/y/o/g/o/". The seventh row, R7, stores a word ID "007", a word spelling "Mie", a word reading "mie", and a phonemic sequence "/m/i/e/". In other words, the recognition word dictionary table 4a contains names from the Kinki region, which merely an example.

The rejectable word dictionary 5 stores a plurality of rejectable vocabulary words and information regarding the plurality of rejectable vocabulary words. As shown, for instance, in FIG. 3, the rejectable word dictionary 5 stores the plurality of rejectable vocabulary words and information regarding the plurality of rejectable vocabulary words in the form of a rejectable word dictionary table 5a. In the example illustrated in FIG. 3, the rejectable word dictionary table 5a stores word IDs, word spellings, word readings, and phonemic sequences. The word IDs represent information uniquely associated with the rejectable vocabulary words. The word spellings represent information describing the way the rejectable vocabulary words are written. The word readings represent information related to the reading of the rejectable vocabulary words reflected in the word spellings. The phonemic sequences are the rejectable vocabulary words subject to degree-of-similarity computation by the speech verification unit 7. It should be noted that while the rejectable vocabulary word-related information includes the word IDs, word spellings, and word readings described above, it may additionally include other arbitrary information, such as rules regarding connections (grammar information) between the rejectable vocabulary words.

In the example illustrated in FIG. 3, the first row, R1, of the rejectable word dictionary table 5*a* stores a word ID "101", a word spelling "Tokyo", a word reading "toukyou", and a phonemic sequence "/t/o/k/y/o/". The second row, R2, stores a word ID "102", a word spelling "Saga", a word reading "saga", and a phonemic sequence "/s/a/g/a/". The third row, R3, stores a word ID "103", a word spelling "Oita", a word reading "ooita", and a phonemic sequence "/o/i/t/a/". The fourth row, R4, stores a word ID "104", a word spelling "Okayama", a word reading "okayama", and a phonemic sequence "/o/k/a/y/a/m/a/". The fifth row, R5, stores a word ID "105", a word spelling "Toyama", a word reading "toyama", and a phonemic sequence "/t/o/y/a/m/a/".

The acoustic model storage unit 6 stores data obtained by statistically modeling information describing what kind of phonemes tend to produce what kind of characteristic quantities. HMM (Hidden Markov Models), DP (Dynamic Programming), etc. are suggested as examples of the acoustic models.

The speech verification unit 7 uses the characteristic quantities obtained through conversion by the speech analysis unit 3 to compute the degree of similarity between the input speech and the recognition vocabulary words stored in the recognition word dictionary 4. Moreover, the speech verification unit 7 uses the characteristic quantities obtained through conversion by the speech analysis unit 3 to compute the degree of similarity between the input speech and the rejectable vocabulary words stored in the rejectable word dictionary 5. Specifically, the speech verification unit 7 extracts a phoneme string for each frame (fixed time period) contained in the voiced intervals by comparing the characteristic quantities obtained through conversion by the speech analysis unit 3 with the data stored in the acoustic model storage unit 6. The speech verification unit 7 computes the degree of similarity of the recognition vocabulary words by comparing the extracted phoneme strings with the phonemic sequences stored in the recognition word dictionary 4. Moreover, the speech verification unit 7 computes the degree of similarity of the rejectable vocabulary words by comparing the extracted phoneme strings with the phonemic sequences stored in the rejectable word dictionary 5. Furthermore, the process of computing the degree of similarity makes use of previously known algorithms employed in degree-of-similarity computation.

Based on the degree of similarity of the recognition vocabulary words computed above, the speech verification unit 7 extracts recognition vocabulary words with the highest degree of similarity from the recognition vocabulary words as recognition candidates. Moreover, based on the degree of similarity of the rejectable vocabulary words computed above, the speech verification unit 7 extracts rejectable vocabulary words with the highest degree of similarity from the rejectable vocabulary words as rejection candidates.

The first threshold value storage unit 8 stores a first threshold value, which is used as a measure for rejecting input speech. As shown, for instance, in FIG. 4, the first threshold value storage unit 8 stores the first threshold value in the form of a first threshold value storage table 8*a*. In the example illustrated in FIG. 4, "0.5" is stored as the first threshold value. It should be noted that the first threshold value stored in the first threshold value storage unit 8 is preset, for instance, by the system administrator of the information-providing system provided with the speech recognition apparatus 1.

The second threshold value storage unit 9 stores a second threshold value, which is larger than the first threshold value and is used as a measure for outputting recognition candidates as a recognition result. As shown, for instance, in FIG. 5, the second threshold value storage unit 9 stores the second threshold value in the form of a second threshold value storage table 9*a*. In the example illustrated in FIG. 5, "0.8" is stored as the second threshold value. It should be noted that the second threshold value stored in the second threshold value storage unit 9 is also preset, for instance, by the system administrator of the information-providing system provided with the speech recognition apparatus 1.

Incidentally, although the explanations above were given using an example, in which the recognition word dictionary 4, rejectable word dictionary 5, first threshold value storage unit 8, and second threshold value storage unit 9 stored data in a tabular format, the format of storage is not limited thereto. In other words, the storage format is discretionary.

The speech verification unit 7 outputs the recognition candidates as a recognition result if the degree of similarity of the recognition candidates is greater than the second threshold value. Moreover, if the degree of similarity of the recognition candidates is smaller than the second threshold value, the speech verification unit 7 outputs the recognition candidates when the degree of similarity of the recognition candidates is greater than the first threshold value and, at the same time, the degree of similarity of the recognition candidates is greater than the degree of similarity of the rejection candidates. It should be noted that the recognition results may be passed on to a higher-level software program as well as outputted to output devices such as displays, speakers, and printers, etc. Moreover, the recognition results may be outputted as commands to a CPU, not shown.

On the other hand, if the degree of similarity of the recognition candidates is greater than the first threshold value, the speech verification unit 7 rejects input speech when the degree of similarity of the recognition candidates is smaller than the second threshold value and, at the same time, the degree of similarity of the recognition candidates is smaller than the degree of similarity of the rejection candidates. Moreover, the speech verification unit 7 rejects input speech when the degree of similarity of the recognition candidates is smaller than the first threshold value.

Figure 6:
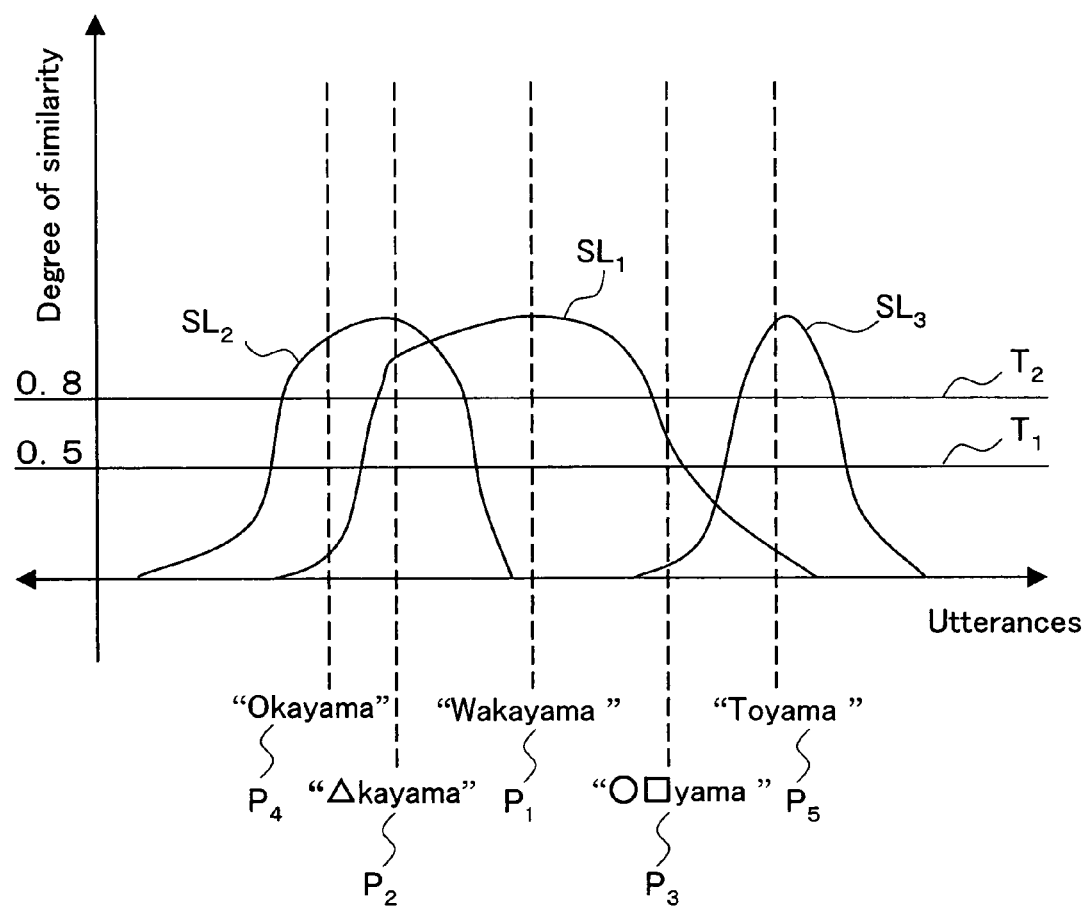
FIG. 6 is a conceptual diagram illustrating the relationship between user utterances and the degree of similarity of the utterances to recognition candidates and rejection candidates.

The above-mentioned verification process performed by the speech verification unit 7 is specifically illustrated herein. FIG. 6 is a conceptual diagram illustrating the relationship between user utterances and the degree of similarity of the utterances to recognition candidates and rejection candidates. $SL_1$ is a curve showing the similarity of the recognition candidate "wakayama" and user utterances. $SL_2$ is a curve showing the similarity of the recognition candidate "okayama" and user utterances. $SL_3$ is a curve showing the similarity of the recognition candidate "toyama" and user utterances. $T_1$ designates a first threshold value. $T_2$ designates a second threshold value. It should be noted that the utterance "Δkayama" ($P_2$ in FIG. 6) shown among the user utterances designates an utterance condition between "okayama" ($P_4$ in FIG. 6) and "wakayama" ($P_1$ in FIG. 6), with said utterance condition being closer to "okayama". Moreover, the utterance "o☐yama" ($P_3$ in FIG. 6) shown among the user utterances designates an utterance condition between "wakayama" ($P_1$ in FIG. 6) and "toyama" ($P_5$ in FIG. 6), with said utterance condition being closer to "toyama".

In such a case, when the user utters the word "wakayama" ($P_1$ in FIG. 6), $SL_1$ exceeds the second threshold value $T_2$ and, as a result, the speech verification unit 7 outputs the recognition candidate "wakayama" as a recognition result. Moreover, when the user utters the word "Δkayama" ($P_2$ in FIG. 6), $SL_2$ exceeds $SL_1$, but because $SL_1$ exceeds the second threshold value $T_2$, the speech verification unit 7 outputs the recognition candidate "wakayama" as a recognition result. In other words, in the past, when the $SL_2$ exceeded $SL_1$, the speech verification unit 7 rejected the user utterance "Δkayama", but in the present embodiment, even in the case wherein $SL_2$ exceeds $SL_1$, the speech verification unit 7 outputs the recognition candidates "wakayama" as a recognition result so long as $SL_1$ exceeds the second threshold value $T_2$. Moreover, when the user utters the word "o☐yama" ($P_3$ in FIG. 6), $SL_1$ becomes smaller than the second threshold value $T_2$, but because $SL_1$ exceeds the first threshold value $T_1$ and, in addition, $SL_1$ exceeds $SL_3$, the speech verification unit 7 outputs the recognition candidate "wakayama" as a recognition result.

On the other hand, when the user utters the word "okayama" ($P_4$ in FIG. 6), $SL_1$ becomes smaller than the first threshold value $T_1$ and, as a result, the speech verification unit 7 rejects the user utterance "okayama". Moreover, when the user utters the word "toyama" ($P_5$ in FIG. 6), $SL_1$ becomes smaller than the first threshold value $T_1$ and, as a result, the speech verification unit 7 rejects the user utterance "toyama".

Incidentally, the above-described speech recognition apparatus 1 is implemented by installing a software program on any computer, such as a personal computer, etc. In other words, the above-described speech input unit 2, speech analysis unit 3, and speech verification unit 7 are implemented as a result of the computer's CPU operating in accordance with a software program incorporating their functionality. Therefore, the software program incorporating the functionality of the speech input unit 2, speech analysis unit 3, and speech verification unit 7, or a recording medium having the program recorded thereon, represent an embodiment of the present invention. In addition, the recognition word dictionary 4, rejectable word dictionary 5, acoustic model storage unit 6, first threshold value storage unit 8, and second threshold value storage unit 9 are implemented using a built-in storage device incorporated in a computer or a storage device accessible by the computer.

Next, the processing performed by the speech recognition apparatus 1 of the above-described configuration will be explained with reference to FIG. 7.

Figure 7:
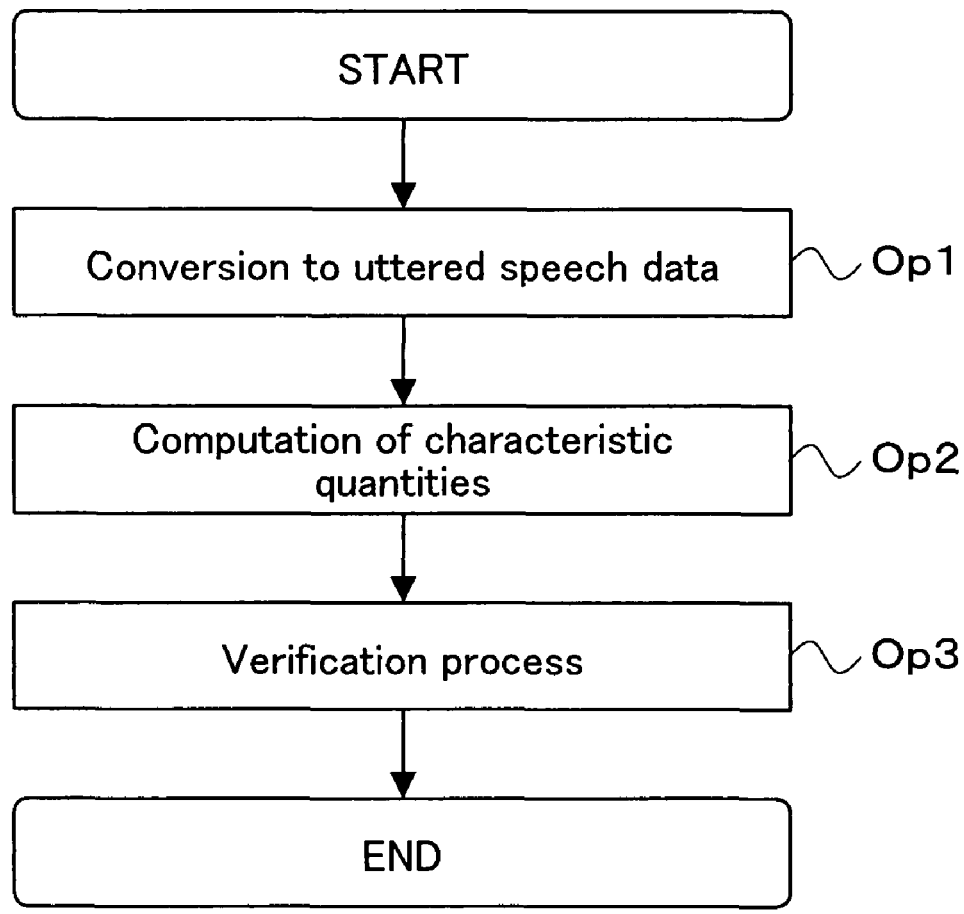
FIG. 7 is a flow chart illustrating an example of operation of the speech recognition apparatus.

FIG. 7 is a flow chart outlining the processing performed by the speech recognition apparatus 1. Namely, as shown in FIG. 7, when the user makes an utterance, the speech input unit 2 uses predetermined voiced interval determination criteria to determine voiced intervals in the input speech and converts speech in the determined voiced intervals to uttered speech data (Op1). The speech analysis unit 3 computes characteristic quantities by analyzing the uttered speech data (Op2). The speech verification unit 7 then carries out the above-described verification process (Op3). Namely, the speech verification unit 7 uses the characteristic quantities to carry out processing (verification processing) to output recognition candidates as a recognition result or reject the input speech.

Next, the verification operation (Op3) of FIG. 7 will be explained with reference to FIG. 8.

Figure 8:
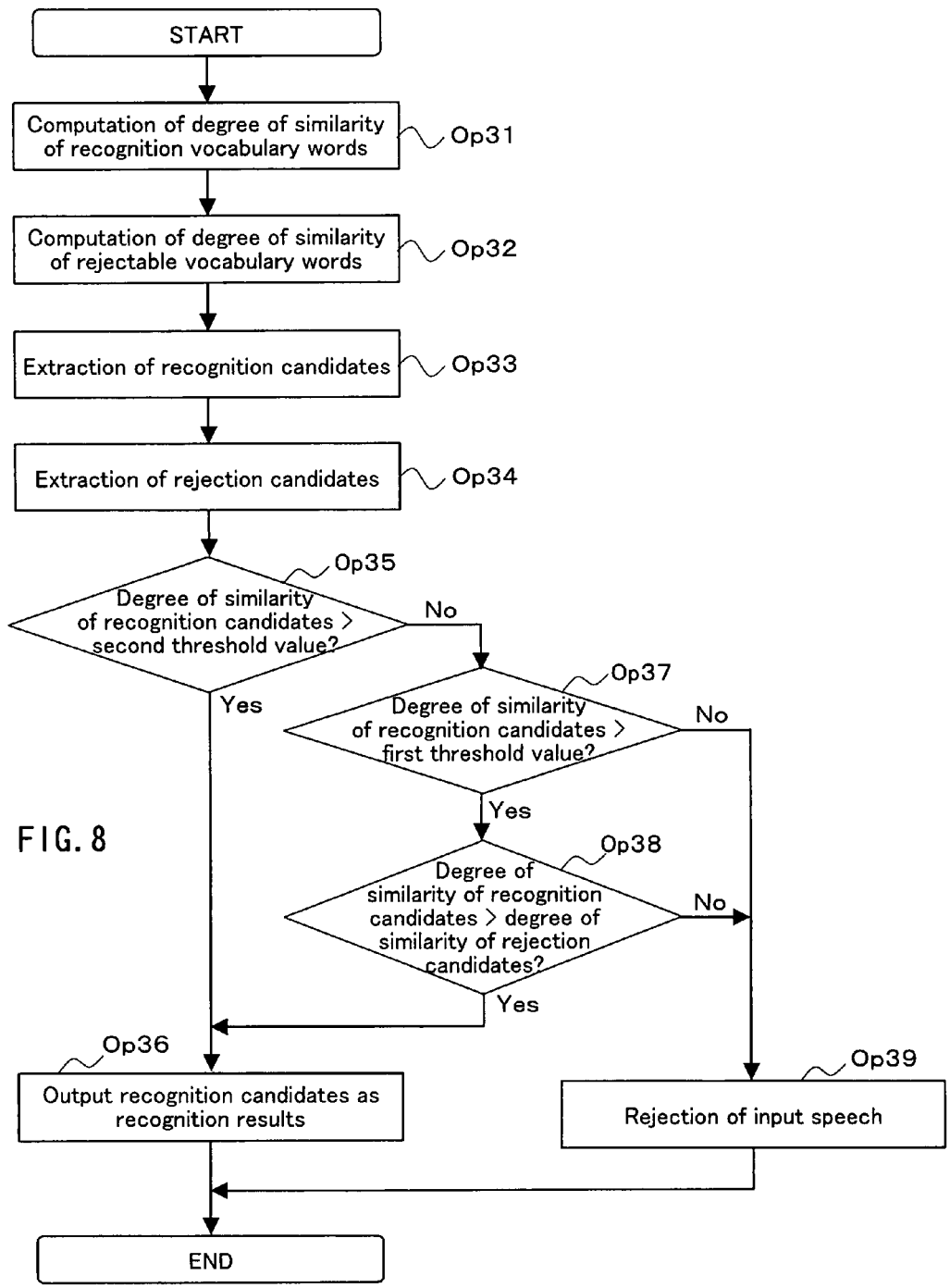
FIG. 8 is a flow chart illustrating an example of operation of a speech verification unit used in the speech recognition apparatus.

FIG. 8 is a flow chart outlining the verification process performed by the speech verification unit 7. Namely, as shown in FIG. 8, the speech verification unit 7 extracts a phoneme string for each frame (fixed time period) contained in the voiced intervals by comparing the characteristic quantities obtained through conversion by the speech analysis unit 3 with the data stored in the acoustic model storage unit 6. The speech verification unit 7 computes the degree of similarity of the recognition vocabulary words by comparing the extracted phoneme strings with the phonemic sequences stored in the recognition word dictionary 4 (Op31). Moreover, the speech verification unit 7 computes the degree of similarity of the rejectable vocabulary words by comparing the extracted phoneme strings with the phonemic sequences stored in the rejectable word dictionary 5 (Op32). Based on the degree of similarity of the recognition vocabulary words computed in Op31, the speech verification unit 7 extracts recognition vocabulary words with the highest degree of similarity from the recognition vocabulary words as recognition candidates (Op33). In addition, based on the degree of similarity of the rejectable vocabulary words computed in Op33, the speech verification unit 7 extracts rejectable vocabulary words with the highest degree of similarity from the rejectable vocabulary words as rejection candidates (Op34).

Here, when the degree of similarity of the recognition candidates is greater than the second threshold value ("YES" in Op35), the speech verification unit 7 outputs the recognition candidates as a recognition result (Op36). On the other hand, when the degree of similarity of the recognition candidates is smaller than the second threshold value ("NO" in Op35), control proceeds to Op37.

In Op37, when the degree of similarity of the recognition candidates is greater than the first threshold value ("YES" in Op37), control proceeds to Op38. On the other hand, when the degree of similarity of the recognition candidates is smaller than the first threshold value ("NO" in Op37), the input speech is rejected (Op39).

In Op38, when the degree of similarity of the recognition candidates is greater than the degree of similarity of the rejection candidates ("YES" in Op35), the speech verification unit 7 outputs the recognition candidates as a recognition result (Op36). On the other hand, when the degree of similarity of the recognition candidates is smaller than the degree of similarity of the rejection candidates ("NO" in Op38), the speech verification unit 7 rejects input speech (Op39).

As described above, in the speech recognition apparatus 1 of the present embodiment, if the degree of similarity of the recognition candidates is greater than the second threshold value, the speech verification unit 7 outputs the recognition candidates as a recognition result regardless of the degree of similarity of the rejection candidates. It should be noted that the second threshold value is a measure used for outputting recognition candidates as a recognition result. Therefore, as long as the degree of similarity of the recognition candidates is greater than the second threshold value, the recognition candidates can be outputted as a recognition result even in the case where the degree of similarity of the rejection candidates becomes higher than the degree of similarity of the recognition candidates as a result of the recognition candidates and rejection candidates being identical or similar. For this reason, in the speech recognition apparatus 1 of the present embodiment, user utterances do not get mistakenly rejected when e.g. the user utters recognition candidates even if rejectable vocabulary words that are the same or similar to the recognition vocabulary words are stored in the rejectable word dictionary 5. Therefore, there is no need to update the rejectable word dictionary in the manner used in the conventional speech recognition apparatuses described above, that is, by removing rejectable vocabulary words that are the same or similar to the recognition vocabulary words from the rejectable word database and storing the residual rejectable vocabulary words remaining in the rejectable word database in the rejectable word dictionary whenever changes are made to the recognition vocabulary words stored in the recognition word dictionary. As a result, the manual and time-consuming operations required to update the rejectable word dictionary 5 can be reduced even when changes are made to the recognition vocabulary words stored in the recognition word dictionary 4 while at the same time preventing user utterances from being mistakenly rejected despite the fact that the user utters recognition vocabulary words.

Embodiment 2

Embodiment 1 described an example, in which the speech verification unit outputs rejectable vocabulary words with the highest degree of similarity from the rejectable vocabulary words as rejection candidates. By contrast, Embodiment 2 describes an example, in which the speech verification unit extracts rejectable vocabulary words with the highest degree of similarity from the rejectable vocabulary words as rejection candidates and, based on the compensation data, reduces the degree of similarity of the extracted rejection candidates.

Figure 9:
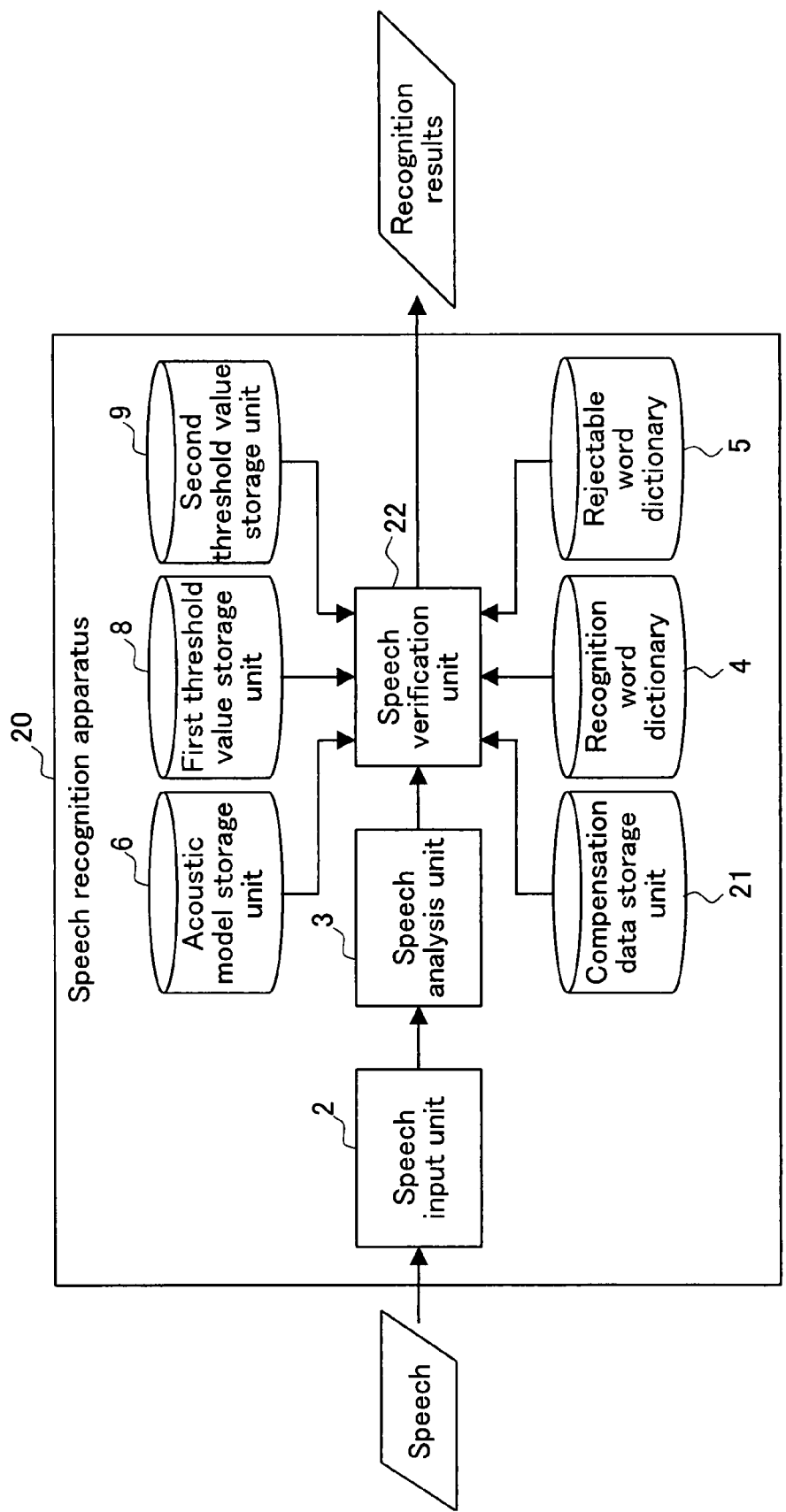
FIG. 9 is a block diagram schematically illustrating the configuration of a speech recognition apparatus according to a second embodiment of the present invention.

FIG. 9 is a block diagram schematically illustrating the configuration of the speech recognition apparatus 20 according to the present embodiment. Namely, the speech recognition apparatus 20 according to the present embodiment is the speech recognition apparatus 1 of FIG. 1 that is additionally provided with a compensation data storage unit 21. Moreover, the speech recognition apparatus 20 according to the present embodiment is provided with a speech verification unit 22 instead of the speech verification unit 7 illustrated in FIG. 1. In FIG. 9, constituent elements having the same functionality as in FIG. 1 are assigned the same reference numerals and their detailed explanation is omitted.

Figure 10:
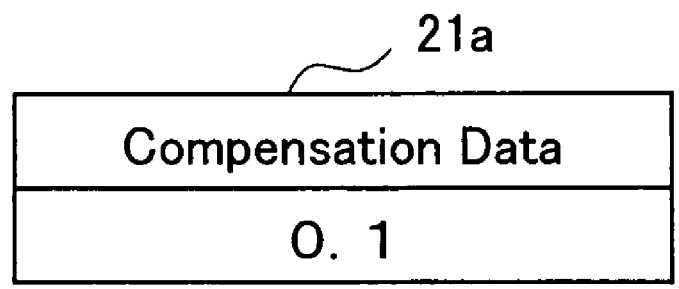
FIG. 10 is a diagram illustrating an exemplary data structure of a compensation data storage unit used in the speech recognition apparatus.

The compensation data storage unit 21 stores compensation data use to reduce the degree of similarity of the rejection candidates. As shown, for instance, in FIG. 10, the compensation data storage unit 21 stores the compensation data in the form of a compensation data table 21a. In the example illustrated in FIG. 10, "0.1" is stored as the compensation data. It should be noted that the storage format used for the compensation data by the compensation data storage unit 21 is discretionary.

In addition to the features of the speech verification unit 7 of FIG. 1, the speech verification unit 22 is provided with a feature whereby it reduces the degree of similarity of the rejection candidates. Specifically, for instance, a read signal is outputted to the speech recognition apparatus 20 based on an instruction from a user operating a system provided with the speech recognition apparatus 20. By detecting the read signal, the speech verification unit 22 reads the compensation data stored in the compensation data storage unit 21. Based on the compensation data it reads, the speech verification unit 22 reduces the degree of similarity of the rejection candidates.

For example, let us assume that the speech verification unit 22 has extracted a rejection candidate such as "okayama". Here, if the degree of similarity of the rejection candidate "okayama" is "0.85", the speech verification unit 22 reduces the degree of similarity, i.e. "0.85", of the rejection candidate "okayama" using the compensation data, "0.1", which is stored in the compensation data storage unit 21. As a result, the degree of similarity of the rejection candidate is reduced to "0.75". The speech verification unit 22 carries out processing wherein, based on the degree of similarity, i.e. "0.75", of the rejection candidate "okayama", it outputs recognition candidates as a recognition result or rejects input speech. Namely, when the degree of similarity of the rejection candidates is decreased, the recognition rate of the speech recognition apparatus 20 goes up. This makes it possible for the user to issue instructions to the speech verification unit 22 regarding whether to reduce the degree of similarity of the rejection candidates or not in accordance with the actual situation (conditions of use, etc.) of the system, in which the speech recognition apparatus 20 is utilized.

Incidentally, the above-described speech recognition apparatus 20 is implemented by installing a software program on any computer, such as a personal computer, etc. In other words, the above-described speech verification unit 22 is implemented as a result of the computer's CPU operating in accordance with a software program incorporating these functions. Therefore, the software program incorporating the functionality of the speech verification unit 22, or a recording medium having the program recorded thereon, represent an embodiment of the present invention. Moreover, the compensation data storage unit 21 is implemented using a built-in storage device incorporated into the computer or a storage device accessible by the computer.

Figure 11:
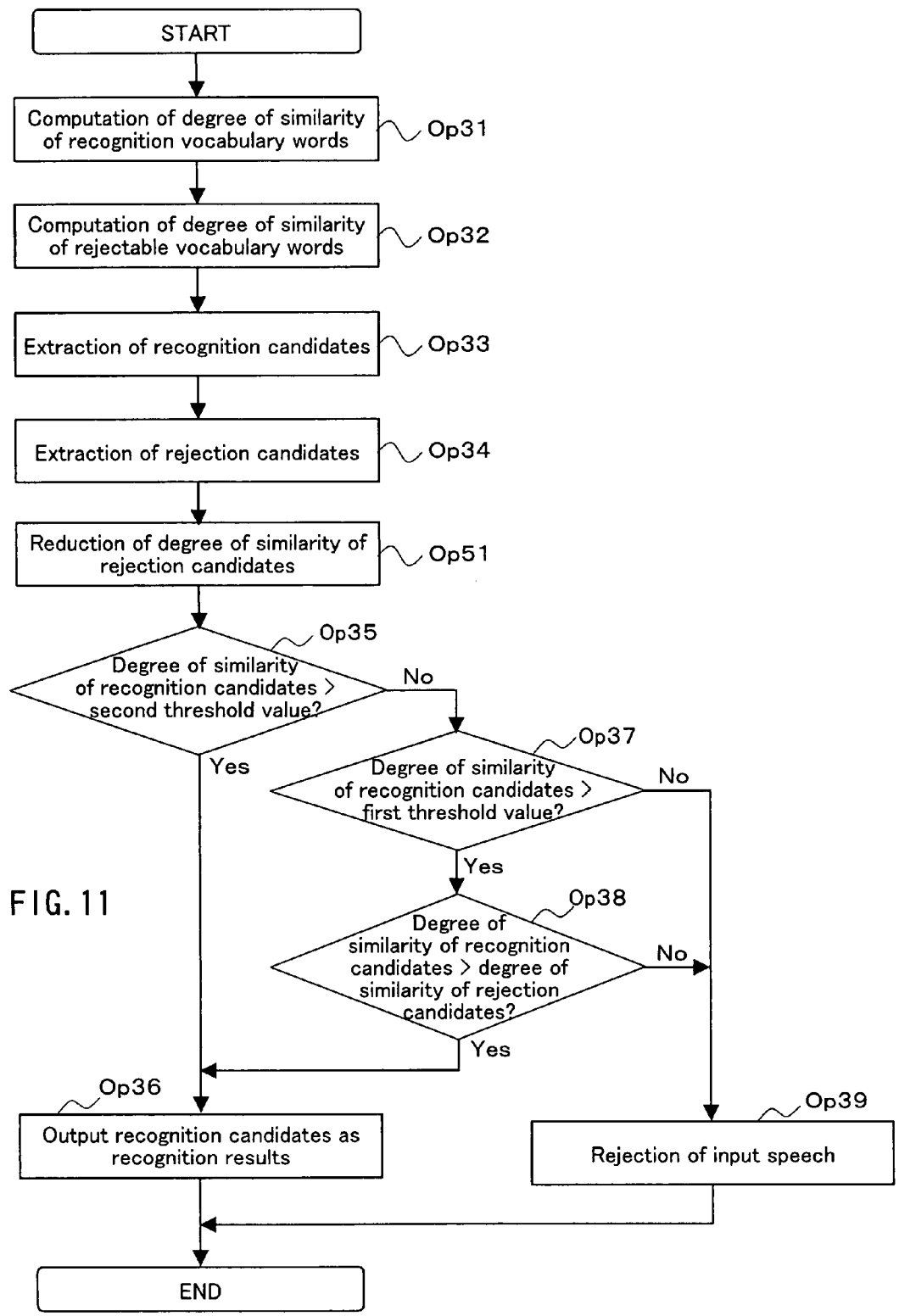
FIG. 11 is a flow chart illustrating an example of operation of a speech verification unit used in the speech recognition apparatus.

Next, the verification processing performed by the speech verification unit 22 used in the speech recognition apparatus 20 of the above-described configuration will be explained with reference to FIG. 11. In FIG. 11, parts showing the same processes as in FIG. 8 are assigned the same reference numerals and their detailed explanation is omitted.

FIG. 11 is a flow chart outlining the verification process performed by the speech verification unit 22. In the processing illustrated in FIG. 11, Op51 is provided between Op34 and Op35. Namely, in Op51, the speech verification unit 22 reduces the degree of similarity of the rejection candidates based on the compensation data stored in the compensation data storage unit 21. When the degree of similarity of the rejection candidates is reduced, it becomes easier for recognition candidates to be outputted as a recognition result in Op38. Namely, when the degree of similarity of the rejection candidates is decreased, the recognition rate of the speech recognition apparatus 20 goes up.

It should be noted that while the explanations above were given using an example, in which the speech verification unit 22 reduced the degree of similarity of the rejection candidates based on the compensation data, the invention is not limited thereto. The speech verification unit 22 may, for instance, increase the degree of similarity of the rejection candidates based on the compensation data. When the degree of similarity of the rejection candidates is increased, it becomes easier for input speech to be rejected in Op38. Namely, when the degree of similarity of the rejection candidates is increased, the recognition rate of the speech recognition apparatus 20 drops.

Moreover, while the explanations above were given using an example, in which the speech verification unit 22 increased or reduced the degree of similarity of the rejection candidates based on the compensation data, the invention is not limited thereto. The speech verification unit 22 may, for instance, increase or decrease the degree of similarity of the recognition candidates based on the compensation data. When the degree of similarity of the recognition candidates is increased, it becomes easier for recognition candidates to be outputted as a recognition result in Op35, Op37, and Op38. Namely, when the degree of similarity of the recognition candidates is increased, the recognition rate of the speech recognition apparatus 20 goes up. On the other hand, when the degree of similarity of the recognition candidates is decreased, it becomes easier input speech to be rejected in Op35, Op37, and Op38. Namely, when the degree of similarity of the rejection candidates is increased, the recognition rate of the speech recognition apparatus 20 drops.

Furthermore, while the explanations above were given using an example, in which the compensation data storage unit 21 stored compensation data valid simultaneously for all the recognition vocabulary words or all the rejectable vocabulary words, the invention is not limited thereto. The compensation data storage unit 21 may, for instance, store compensation data respectively corresponding to each recognition vocabulary word or each rejectable vocabulary word. In such a case, the speech verification unit 22 increases or decreases the degree of similarity of the recognition candidates or the degree of similarity of the rejection candidates based on compensation data respectively corresponding to each recognition vocabulary word or each rejectable vocabulary word.

As described above, in the speech recognition apparatus 20 according to the present embodiment, the speech verification unit 22 increases or decreases at least one degree of similarity among the degree of similarity of the recognition candidates and the degree of similarity of the rejection candidates based on the compensation data. If the speech verification unit 22 decreases the degree of similarity of the recognition candidates or increases the degree of similarity of the rejection candidates, the recognition rate of the speech recognition apparatus 20 decreases. On the other hand, if the speech verification unit 22 increases the degree of similarity of the recognition candidates or decreases the degree of similarity of the rejection candidates, the recognition rate of the speech recognition apparatus 20 goes up. This makes it possible to implement a speech recognition apparatus 20 suited to the actual situation (conditions of use, etc.) of the system provided with the speech recognition apparatus 20.

Embodiment 3

Embodiments 1 and 2 were explained based on examples, in which the second threshold value storage unit 9 stored a second threshold value valid simultaneously for all the recognition vocabulary words. By contrast, Embodiment 3 will be explained using an example, in which the second threshold value storage unit 9 stores second threshold values respectively corresponding to each recognition vocabulary word.

Figure 12:
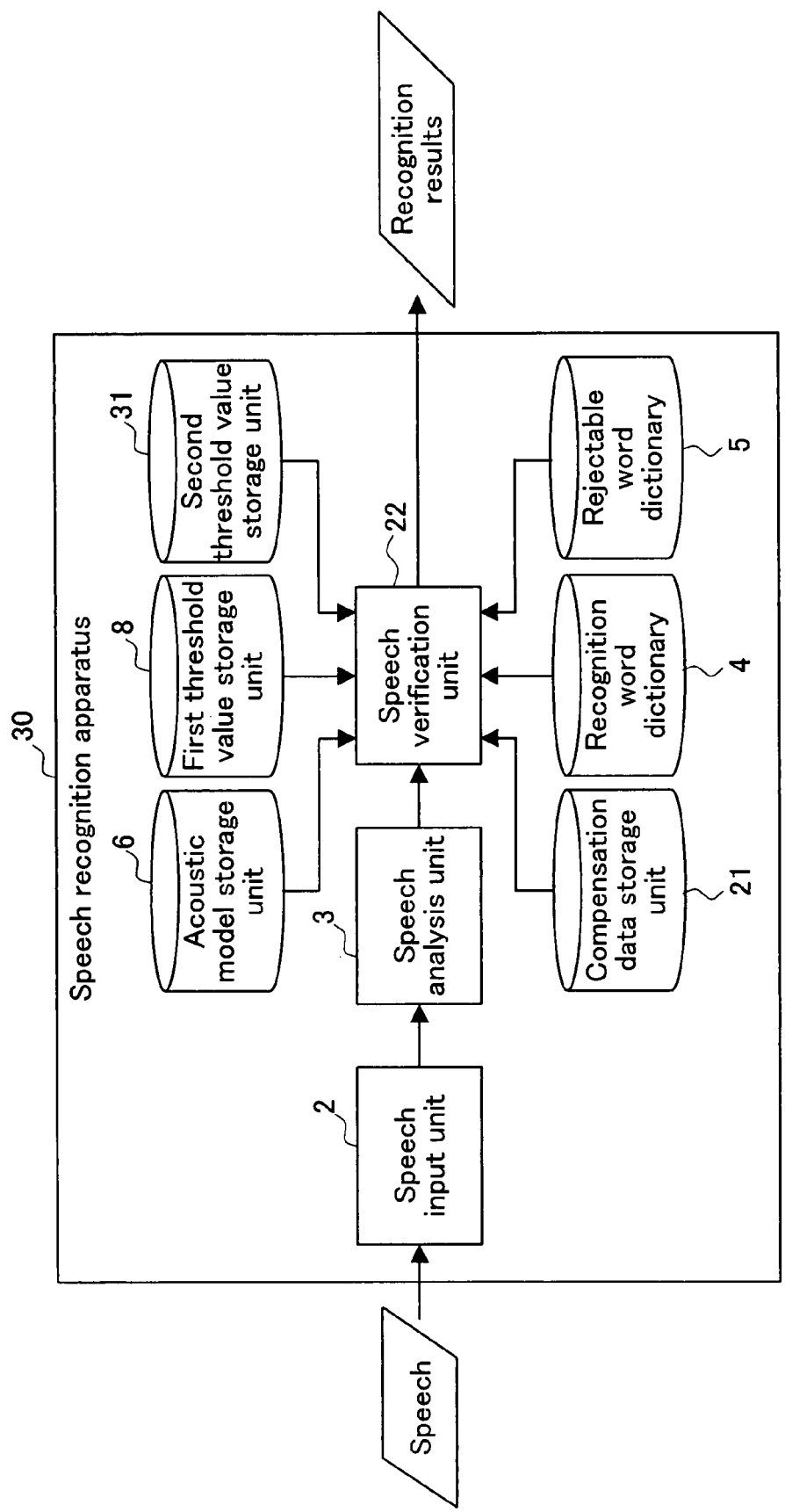
FIG. 12 is a block diagram schematically illustrating the configuration of a speech recognition apparatus according to a third embodiment of the present invention.

FIG. 12 is a block diagram schematically illustrating the configuration of the speech recognition apparatus 30 according to the present embodiment. The speech recognition apparatus 30 according to the present embodiment is provided with a second threshold value storage unit 31 instead of the second threshold value storage unit 9 illustrated in FIG. 9. In FIG. 12, constituent elements having the same functionality as in FIG. 9 are assigned the same reference numerals and their detailed explanation is omitted.

For each recognition vocabulary word, the second threshold value storage unit 31 stores a second threshold value, which is larger than the first threshold value and is used as a measure for outputting recognition candidates as a recognition result. As shown, for instance, in FIG. 13, the second threshold value storage unit 31 stores the second threshold values in the form of a second threshold value storage table 31*a*. In the example illustrated in FIG. 13, the second threshold value storage table 31*a* stores word ID and second threshold values. The word IDs correspond to the word IDs stored in the recognition word dictionary 4. It should be noted that the second threshold value storage unit 31 is implemented using a built-in storage device incorporated into the computer or a storage device accessible by the computer. In addition, the storage format used for the second threshold values by the second threshold value storage unit 31 is discretionary.

In the example illustrated in FIG. 13, the first row, R1, of the second threshold value storage table 31*a* stores word ID "001" and a second threshold value, "0.7". The second row, R2, stores word ID "002" and a second threshold value, "0.8". The third row, R3, stores word ID "003" and a second threshold value, "0.7". The fourth row, R4, stores word ID "004" and a second threshold value, "0.8". The fifth row, R5, stores word ID "005" and a second threshold value, "0.7". The sixth row, R6, stores word ID "006" and a second threshold value, "0.7". The seventh row, R7, stores word ID "007" and a second threshold value, "0.9". In other words, in the example illustrated in FIG. 13, the second threshold values are set in such a manner that the second threshold values are larger for shorter recognition vocabulary words and, at the same time, the second threshold values are smaller for longer recognition vocabulary words.

Incidentally, while the explanations above were given using an example, in which a plurality of recognition vocabulary words and information related to a plurality of recognition vocabulary words were stored in the recognition word dictionary 4 and second threshold values respectively corresponding to each recognition vocabulary word were stored in the second threshold value storage unit 31, the invention is not limited thereto. The second threshold values stored in the second threshold value storage unit 31 may, for instance, be provided in the recognition word dictionary 4.

Figure 14:
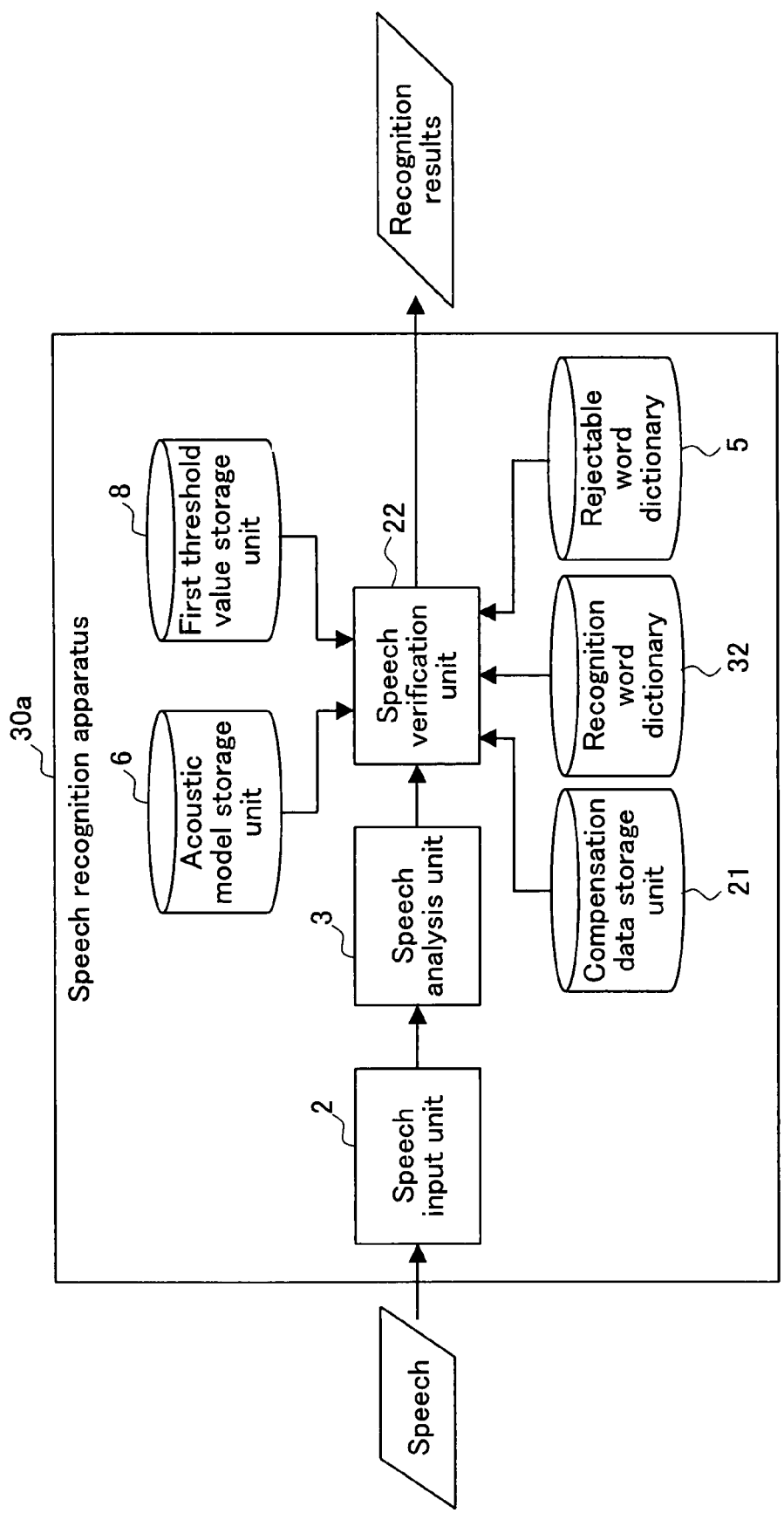
FIG. 14 is a block diagram schematically illustrating the configuration of the speech recognition apparatus in case the second threshold value stored in the second threshold value storage unit is stored in the recognition word dictionary of the speech recognition apparatus.

FIG. 14 is a block diagram schematically illustrating the configuration of the speech recognition apparatus 30*a* in case the second threshold value is stored in the recognition word dictionary. Namely, instead of the recognition word dictionary 4 illustrated in FIG. 12, the speech recognition apparatus 30*a* illustrated in FIG. 14 is provided with a recognition word dictionary 32. In FIG. 14, constituent elements having the same functionality as in FIG. 12 are assigned the same reference numerals. The recognition word dictionary 32 stores a plurality of recognition vocabulary words, information regarding the plurality of recognition vocabulary words, and second threshold values. As shown, for instance, in FIG. 15, the recognition word dictionary 32 stores the information items in the form of a recognition word dictionary table 32*a*. In the example illustrated in FIG. 15, the recognition word dictionary table 32*a* stores word IDs, word spellings, word readings, phonemic sequences and second threshold values. It should be noted that the storage format used for these information items in the recognition word dictionary 32 is discretionary. In addition, in the speech recognition apparatus 30*a* illustrated in FIG. 14, the recognition word dictionary 32 corresponds to the recognition word dictionary and second threshold value storage unit mentioned in the claims.

As described above, in the speech recognition apparatuses 30 and 30*a* according to the present embodiment, second threshold values respectively corresponding to each recognition vocabulary word are stored in the second threshold value storage unit 31 or recognition word dictionary 32. This allows the speech verification unit 22 to vary the measure used to output recognition candidates as a recognition result in response to the recognition vocabulary words.

Embodiment 4

Embodiments 1-3 were explained using examples, in which there is provided a single rejectable word dictionary. By contrast, Embodiment 4 will be explained using an example, in which there are provided a plurality of rejectable word dictionaries with different numbers of rejectable vocabulary words.

Figure 16:
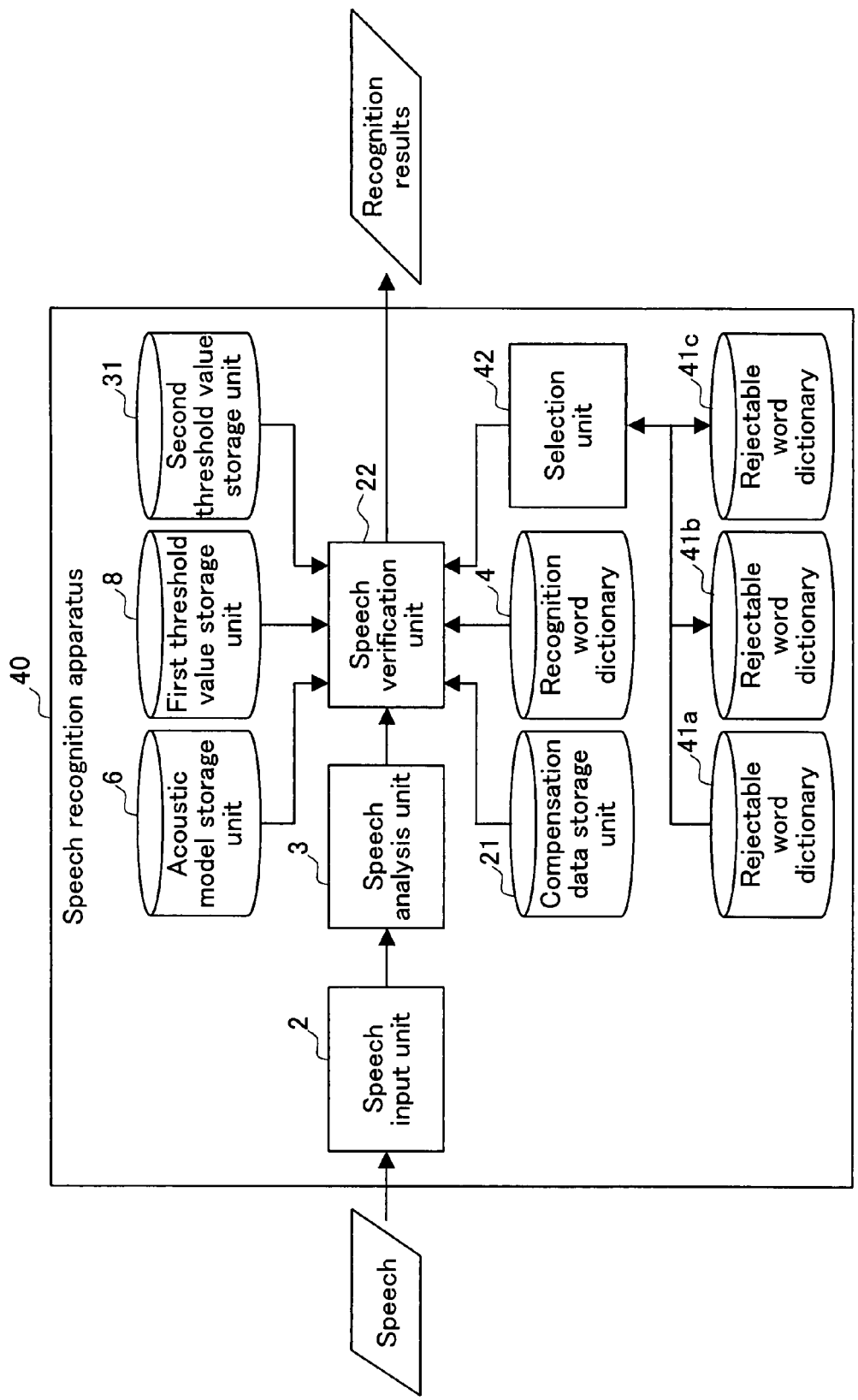
FIG. 16 is a block diagram schematically illustrating the configuration of a speech recognition apparatus according to a fourth embodiment of the present invention.

FIG. 16 is a block diagram schematically illustrating the configuration of the speech recognition apparatus 40 according to the present embodiment. Instead of the rejectable word dictionary 5 illustrated in FIG. 12, the speech recognition apparatus 40 according to the present embodiment is provided with a plurality of rejectable word dictionaries 41a-41c. Moreover, the speech recognition apparatus 40 according to the present embodiment is the speech verification unit 30 illustrated in FIG. 12 additionally provided with a selection unit 42. It should be noted that while FIG. 16 shows three rejectable word dictionaries 41a-41c in order to simplify explanation, the number of the rejectable word dictionaries forming part of the speech recognition apparatus 40 is discretionary.

In the same manner as the rejectable word dictionary 5 of FIG. 12, the rejectable word dictionaries 41a-41c store a plurality of rejectable vocabulary words and information regarding the plurality of rejectable vocabulary words. The rejectable word dictionaries 41a-41c are a plurality of rejectable word dictionaries with different numbers of rejectable vocabulary words. In the present embodiment, by way of example, the rejectable word dictionary 41a stores 100 rejectable vocabulary words. The rejectable word dictionary 41b stores 500 rejectable vocabulary words including the 100 rejectable vocabulary words stored in the rejectable word dictionary 41a. The rejectable word dictionary 41c stores 900 rejectable vocabulary words including the 500 rejectable vocabulary words stored in the rejectable word dictionary 41b.

The selection unit 42, based on the number of the recognition vocabulary words stored in the recognition word dictionary 4, selects a rejectable word dictionary subject to degree-of-similarity computation by the speech verification unit 22 from among the plurality of rejectable word dictionaries 41a-41c. In the present embodiment, the selection unit 42 selects the rejectable word dictionary in such a manner that the sum of the number of recognition vocabulary words in the recognition word dictionary 4 and the number of rejectable vocabulary words in the rejectable word dictionary is approximately 1000 words. For instance, if the number of the recognition vocabulary words stored in the recognition word dictionary 4 is 900 words, the selection unit 42 selects the rejectable word dictionary 41a, which stores 100 rejectable vocabulary words. Moreover, for instance, if the number of the recognition vocabulary words stored in the recognition word dictionary 4 is 500 words, the selection unit 42 selects the rejectable word dictionary 41b, which stores 500 rejectable vocabulary words. Furthermore, for instance, if the number of the recognition vocabulary words stored in the recognition word dictionary 4 is 100 words, it selects the rejectable word dictionary 41c, which stores 900 rejectable vocabulary words. In other words, as the number of the recognition vocabulary words stored in the recognition word dictionary 4 increases, the selection unit 42 selects a rejectable word dictionary with a smaller number of rejectable vocabulary words. As a result, the number of rejectable vocabulary words and recognition vocabulary words subject to degree-of-similarity computation by the speech verification unit 22 can be kept constant.

Incidentally, the above-described speech recognition apparatus 40 is implemented by installing a software program on any computer, such as a personal computer, etc. In other words, the above-described selection unit 41 is implemented as a result of the computer's CPU operating in accordance with a software program incorporating these functions. Therefore, the software program incorporating the functionality of the selection unit 41, or a recording medium having the program recorded thereon, represent an embodiment of the present invention. Moreover, the rejectable word dictionaries 41a-41c are implemented using a built-in storage device incorporated into the computer or a storage device accessible by the computer.

As described above, in the speech recognition apparatus 40 according to the present embodiment, the selection unit 42, based on the number of the recognition vocabulary words stored in the recognition word dictionary 4, selects a rejectable word dictionary subject to degree-of-similarity computation by the speech verification unit 22 from among the plurality of rejectable word dictionaries 41a-41c. For instance, as the number of the recognition vocabulary words stored in the recognition word dictionary 4 increases, the selection unit 42 selects a rejectable word dictionary with a smaller number of rejectable vocabulary words. This makes it possible to maintain a constant speed of recognition in the speech recognition apparatus 40 and avoid bringing about a decrease in the speed of recognition of the speech recognition apparatus 40.

Accordingly, the present invention is useful as a speech recognition apparatus, a speech recognition method, and a recording medium having recording thereon a speech recognition software program, which is capable of preventing user utterances from being mistakenly rejected when the user utters recognition vocabulary words, and, at the same time, being able to reduce manual and time-consuming operations required to update the rejectable word dictionary even when changes are made to the recognition vocabulary words stored in the recognition word dictionary.

It should be noted that all of the explained embodiments mentioned above are merely illustrative examples of the present invention and the present invention should not be interpreted restrictively based on these embodiments. The scope of the present invention is indicated in the claims rather than in the above-mentioned embodiments and is intended to include all modifications within the meaning and range of equivalence of the claims.

What is claimed is:

1. A speech recognition apparatus comprising:
   a speech input unit that converts input speech into uttered speech data;
   a speech analysis unit that converts the uttered speech data into characteristic quantities;
   a recognition word dictionary that stores a plurality of recognition vocabulary words;
   a rejectable word dictionary that stores a plurality of rejectable vocabulary words;
   a speech verification unit that computes the degree of similarity between the input speech and the plurality of recognition vocabulary words stored in the recognition word dictionary using the characteristic quantities obtained through conversion by the speech analysis unit, computes the degree of similarity between the input speech and the plurality of rejectable vocabulary words stored in the rejectable word dictionary using the characteristic quantities obtained through conversion by the speech analysis unit, and, as a result of computing these degrees of similarity, extracts recognition vocabulary words with the highest degree of similarity from among the recognition vocabulary words as recognition candidates, and extracts rejectable vocabulary words with the highest degree of similarity from among the rejectable vocabulary words as rejection candidates;
   a first threshold value storage unit that stores a first threshold value used as a measure for rejecting the input speech; and
   a second threshold value storage unit that stores a second threshold value, which is greater than the first threshold value and is used as a measure for outputting the recognition candidates as a recognition result, wherein the speech verification unit outputs the recognition candidates as a recognition result, if the degree of similarity of the recognition candidates is greater than the second threshold value, and the speech verification unit, if the degree of similarity of the recognition candidates is smaller than the second threshold value, outputs the recognition candidates as a recognition result, when the degree of similarity of the recognition candidates is greater than the first threshold value and, at the same time, the degree of similarity of the recognition candidates is higher than the degree of similarity of the rejection candidates.

2. The speech recognition apparatus according to claim 1, wherein the speech verification unit, if the degree of similarity of the recognition candidates is greater than the first threshold value, rejects the input speech, when the degree of similarity of the recognition candidates is smaller than the second threshold value and, at the same time, the degree of similarity of the recognition candidates is smaller than the degree of similarity of the rejection candidates, and the speech verification unit rejects the input speech, if the degree of similarity of the recognition candidates is smaller than the first threshold value.

3. The speech recognition apparatus according to claim 1, further comprising a compensation data storage unit that stores compensation data used for varying at least one degree of similarity among the degree of similarity of the recognition candidates and the degree of similarity of the rejection candidates, wherein the speech verification unit varies at least one degree of similarity among the degree of similarity of the recognition candidates and the degree of similarity of the rejection candidates based on the compensation data.

4. The speech recognition apparatus according to claim 1, wherein the second threshold value storage unit stores second threshold values respectively corresponding to each of the recognition vocabulary words.

5. The speech recognition apparatus according to claim 1, further comprising:

a plurality of rejectable word dictionaries respectively containing different numbers of rejectable vocabulary words, and a selection unit that selects a rejectable word dictionary subject to degree-of-similarity calculation by the speech verification unit from among the plurality of rejectable word dictionaries based on the number of recognition vocabulary words stored in the rejectable word dictionary.

6. A speech recognition method, wherein a computer provided with a recognition word dictionary that stores a plurality of recognition vocabulary words and a rejectable word dictionary that stores a plurality of rejectable vocabulary words carries out:

a speech input step of converting input speech into uttered speech data;

a speech analysis step of converting the uttered speech data into characteristic quantities; and a speech verification step of computing the degree of similarity between the input speech and the plurality of recognition vocabulary words stored in the recognition word dictionary using the characteristic quantities obtained through conversion in the speech analysis step, computing the degree of similarity between the input speech and the plurality of rejectable vocabulary words stored in the rejectable word dictionary using the characteristic quantities obtained through conversion in the speech analysis step, and, as a result of computing these degrees of similarity, extracting recognition vocabulary words with the highest degree of similarity from among the recognition vocabulary words as recognition candidates and extracting rejectable vocabulary words with the highest degree of similarity from among the rejectable vocabulary words as rejection candidates;

the computer is able to access a first threshold value storage unit that stores a first threshold value used as a measure for rejecting the input speech and a second threshold value storage unit that stores a second threshold value, which is greater than the first threshold value and is used as a measure for outputting the recognition candidates as a recognition result, and the speech verification step further comprises the steps of:

outputting the recognition candidates as a recognition result, if the degree of similarity of the recognition candidates is greater than the second threshold value and, if the degree of similarity of the recognition candidates is smaller than the second threshold value, outputting the recognition candidates as a recognition result, when the degree of similarity of the recognition candidates is greater than the first threshold value and, at the same time, the degree of similarity of the recognition candidates is higher than the degree of similarity of the rejection candidates.

7. A recording medium having recorded thereon a speech recognition software program causing a computer provided with a recognition word dictionary that stores a plurality of recognition vocabulary words and a rejectable word dictionary that stores a plurality of rejectable vocabulary words to carry out speech recognition processing, wherein the computer is caused to carry out:

a speech input process of converting input speech into uttered speech data;

a speech analysis process of converting the uttered speech data into characteristic quantities;

a speech verification process of computing the degree of similarity between the input speech and the plurality of recognition vocabulary words stored in the recognition word dictionary using the characteristic quantities obtained through conversion in the speech analysis process, computing the degree of similarity between the input speech and the plurality of rejectable vocabulary words stored in the rejectable word dictionary using the characteristic quantities obtained through conversion in the speech analysis process, and, as a result of computing these degrees of similarity, extracting recognition vocabulary words with the highest degree of similarity from among the recognition vocabulary words as recognition candidates and extracting rejectable vocabulary words with the highest degree of similarity from among the rejectable vocabulary words as rejection candidates; and the computer is able to access a first threshold value storage unit that stores a first threshold value used as a measure for rejecting the input speech and a second threshold value storage unit that stores a second threshold value, which is greater than the first threshold value and is used as a measure for outputting the recognition candidates as a recognition result, and the speech verification process further causes the computer to carry out the process of outputting the recognition candidates as a recognition result, if the degree of similarity of the recognition candidates is greater than the second threshold value, and if the degree of similarity of the recognition candidates is smaller than the second threshold value, outputting the recognition candidates as a recognition result, when the degree of similarity of the recognition candidates is greater than the first threshold value and, at the same time, the degree of similarity of the recognition candidates is higher than the degree of similarity of the rejection candidates.

\* \* \* \* \*